(12) United States Patent
Merchant

(10) Patent No.: US 8,046,170 B2
(45) Date of Patent: Oct. 25, 2011

(54) APPARATUS AND METHOD FOR ESTIMATING ECCENTRICITY EFFECTS IN RESISTIVITY MEASUREMENTS

(75) Inventor: Gulamabbas Merchant, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 484 days.

(21) Appl. No.: 12/203,207

(22) Filed: Sep. 3, 2008

(65) Prior Publication Data
US 2010/0057365 A1    Mar. 4, 2010

(51) Int. Cl.
G01V 1/40    (2006.01)
(52) U.S. Cl. ......................................................... 702/7
(58) Field of Classification Search .................. 702/7
See application file for complete search history.

(56) References Cited

U.S. PATENT DOCUMENTS

| | | | |
|---|---|---|---|
| 4,302,722 A | 11/1981 | Gianzero | |
| 4,837,517 A | 6/1989 | Barber | |
| 5,157,605 A | 10/1992 | Chandler et al. | |
| 5,600,246 A | 2/1997 | Forgang et al. | |
| 6,470,274 B1 | 10/2002 | Mollison et al. | |
| 6,502,036 B2 | 12/2002 | Zhang et al. | |
| 6,636,045 B2 | 10/2003 | Tabarovsky et al. | |
| 6,643,589 B2 | 11/2003 | Zhang et al. | |
| 6,801,039 B2 | 10/2004 | Fabris et al. | |
| 6,868,736 B2 | 3/2005 | Sawatari et al. | |
| 2003/0141872 A1 | 7/2003 | Clark et al. | |
| 2005/0083064 A1 | 4/2005 | Homan et al. | |
| 2005/0083161 A1 | 4/2005 | Minerbo et al. | |
| 2005/0256645 A1 | 11/2005 | Rabinovich et al. | |
| 2006/0248735 A1* | 11/2006 | Haugland | 33/304 |
| 2007/0234787 A1 | 10/2007 | Rabinovich et al. | |
| 2008/0078580 A1* | 4/2008 | Bittar | 175/41 |

OTHER PUBLICATIONS

J. H. Moran et al., "Basic Theory of Induction Logging and Application of Study of Two-Coil Sondes," Geophysics, vol. XXVII, No. 6, Part 1, Dec. 1962, pp. 829-858.

* cited by examiner

*Primary Examiner* — Aditya Bhat
(74) *Attorney, Agent, or Firm* — Mossman, Kumar & Tyler, P.C.

(57) ABSTRACT

A method of evaluating an earth formation is disclosed which includes conveying a logging tool into a borehole in the earth formation and using the logging tool to obtain a first set of azimuthally-independent resistivity measurements of the earth formation and a second set of azimuthally-sensitive resistivity measurements of the earth formation and estimating a value of a property of the earth formation using the first set of measurements and the second set of measurements, the estimation being substantially unaffected by a displacement of the logging tool from a center of the borehole.

19 Claims, 12 Drawing Sheets

APPARATUS AND METHOD FOR ESTIMATING ECCENTRICITY EFFECTS IN RESISTIVITY MEASUREMENTS

BACKGROUND OF THE DISCLOSURE

1. Field of the Disclosure

The present disclosure relates to methods for obtaining a resistivity parameter of a formation from a logging tool in a borehole penetrating the formation. In particular, the present disclosure relates to correcting resistivity measurements for the effect of tool eccentricity within the borehole.

2. Description of the Related Art

Multiple Propagation Resistivity (MPR) tools are often used for measuring resistivity properties of a formation. An MPR tool typically includes transmitter coils and receiver coils having magnetic moments oriented parallel to and coincident with the tool axis. Increasingly, MPR tools are used for the purpose of determining well placement and to navigate reservoirs so as to maintain a borehole trajectory along a predetermined path. For example, it may be desired to place the borehole in an oil-producing formation for most of the borehole trajectory. However, MPR tools do not detect azimuthal variations in resistivity. An azimuthal propagation resistivity (APR) tool has recently been introduced that is sensitive to azimuthal variations in resistivity. The APR tool typically includes transmitter coils as well as receiver coils that are oriented perpendicular to the transmitter coils. As a result of azimuthal sensitivity, an APR tool can be responsive to formations ahead of the APR tool. Directional information may thereby be provided regarding formations ahead of the tool.

Signal responses obtained at an APR tool are generally affected by the degree of eccentricity of the APR tool from the central axis of the borehole. In horizontal and highly-deviated boreholes, tool eccentricity is common since the tool may sag toward or even rest upon a lower portion of a horizontal borehole due to the pull of gravity. The APR tool signal may thus be a superposition of a signal obtained from a nearby formation and a signal resulting from the eccentricity of the APR tool. An additional issue is related to the invasion of borehole mud into the formation. An invasion front of the borehole mud, which may be reasonably assumed to be azimuthally symmetric when occurring in a vertical borehole, is more likely to be azimuthally asymmetric when the occurring in a deviated or horizontal borehole. In other words, the invasion front may extend further below the borehole than above, due to the pull of gravity. These asymmetrical effects induce an additional unwanted signal at the APR tool.

APR tools are typically designed to minimize these tool eccentricity effects by, for example, using a bucking coil. In general, the bucking coil works effectively in canceling a field that is directly coupled from the transmitter coil to the receiver coils and helps reduce tool eccentricity effects and other near-borehole effects. However, in some cases tool eccentricity effects may still be significant. Additional effects may be related to the resistivity of the formation or of the mud used in drilling. For example, in a borehole having a resistive drilling mud therein and which penetrates a shale bed, the contribution of unwanted signals to the APR tool measurements can be anomalously large. Modeling results confirm that measurements obtained from a borehole filled with resistive mud may display a larger eccentricity effect than measurements obtained from a borehole filled with conductive mud. Therefore, there is a need to remove or reduce the effects of eccentricity on the APR measurements.

SUMMARY OF THE DISCLOSURE

One embodiment of the disclosure is a method of evaluating an earth formation. The method includes conveying a logging tool into a borehole in the earth formation and using the logging tool to obtain a first set of azimuthally-independent resistivity measurements of the earth formation and a second set of azimuthally-sensitive resistivity measurements of the earth formation. The method further includes estimating a value of a property of the earth formation using the first set of measurements and the second set of measurements, the estimation being substantially unaffected by a displacement of the logging tool from a center of the borehole.

Another embodiment of the disclosure is an apparatus configured to evaluate an earth formation. The apparatus includes a logging tool configured to be conveyed into a borehole and obtain a first set of azimuthally-independent resistivity measurements of the formation and a second set of azimuthally-sensitive resistivity measurements of the formation. The apparatus further includes at least one processor configured to estimate a value of a property of the earth formation using the first set of measurements and the second set of measurements, the estimation being substantially unaffected by a displacement of the logging tool from a center of the borehole.

Another embodiment of the disclosure is a computer-readable medium accessible to at least one processor, the computer-readable medium including instructions which enable the at least one processor to use a first set of azimuthally-independent resistivity measurements made by the logging tool conveyed in a borehole and a second set of azimuthally sensitive resistivity measurements made by the logging tool to estimate a property of the earth formation, the estimation being substantially unaffected by a displacement of the logging tool from a center of the borehole.

Examples of certain features of the present disclosure are summarized rather broadly in order that the detailed description thereof that follows may be better understood and in order that the contributions they represent to the art may be appreciated. There are, of course, additional features of the invention that will be described hereinafter and which will form the subject of the claims appended hereto.

BRIEF DESCRIPTION OF THE DRAWINGS

The present disclosure is best understood with reference to the following figures in which like numerals refer to like elements and in which.

DETAILED DESCRIPTION OF THE DISCLOSURE

Figure 1:
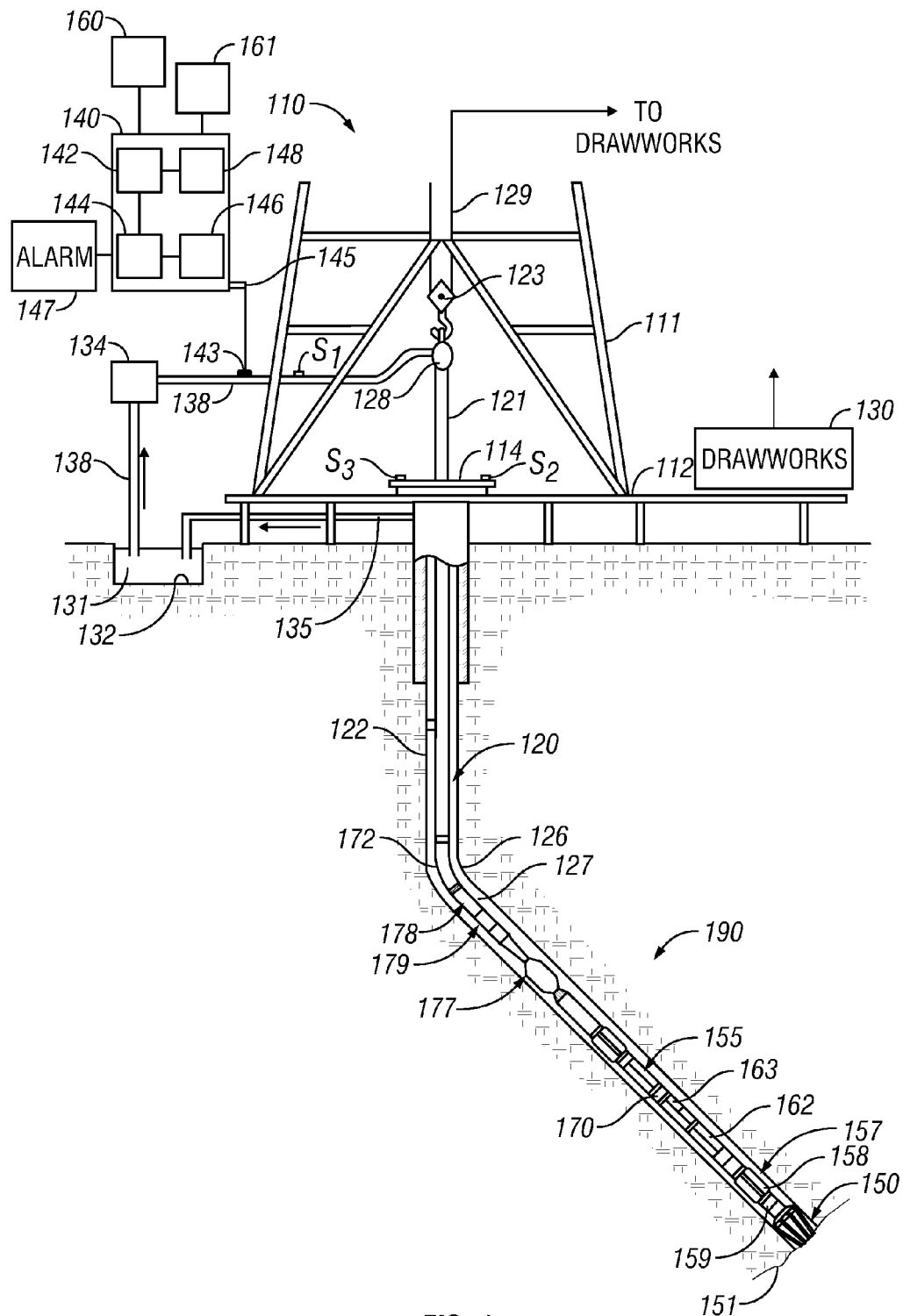
FIG. 1 shows a schematic diagram of a drilling system suitable for use with the methods of the present disclosure and having a drill string carrying a bottomhole assembly in a borehole.

FIG. 1 shows a schematic diagram of a drilling system 110 with a drillstring 120 carrying a drilling assembly 190 (also referred to as the bottom hole assembly, or "BHA") conveyed in a "wellbore" or "borehole" 126 for drilling the borehole. The drilling system 110 includes a conventional derrick 111 erected on a floor 112 which supports a rotary table 114 that is rotated by a prime mover such as an electric motor (not shown) at a desired rotational speed. The drillstring 120 includes a tubing such as a drill pipe 122 or a coiled-tubing extending downward from the surface into the borehole 126. The drill string 120 is pushed into the borehole 126 when a drill pipe 122 is used as the tubing. For coiled-tubing applications, a tubing injector (not shown) is used to move the tubing from a source thereof, such as a reel (not shown), into the borehole 126. The drill bit 150 attached to the end of the drillstring breaks up the geological formations when it is rotated to drill the borehole 126. If a drill pipe 122 is used, the drillstring 120 is coupled to a drawworks 130 via a Kelly joint 121, swivel 128, and line 129 through a pulley 123. During drilling operations, the drawworks 130 is operated to control the weight-on-bit, which is an important parameter that affects the rate of penetration. The operation of the drawworks is well known in the art and is thus not described in detail herein.

During drilling operations, a suitable drilling fluid 131 from a mud pit (source) 132 is circulated under pressure through a channel in the drillstring 120 by a mud pump 134. The drilling fluid passes from the mud pump 134 into the drillstring 120 via a desurger (not shown), fluid line 128 and Kelly joint 121. The drilling fluid 131 is discharged at the borehole bottom 151 through an opening in the drill bit 150. The drilling fluid 131 circulates uphole through the annular space 127 between the drillstring 120 and the borehole 126 and returns to the mud pit 132 via a return line 135. The drilling fluid acts to lubricate the drill bit 150 and to carry borehole cuttings or chips away from the drill bit 150. A sensor $S_1$, typically placed in the line 138, provides information about the fluid flow rate. A surface torque sensor $S_2$ and a sensor $S_3$ associated with the drillstring 120 respectively provide information about the torque and rotational speed of the drillstring. Additionally, a sensor (not shown) associated with line 129 is used to provide the hook load of the drill string 120.

In one embodiment of the disclosure, the drill bit 150 is rotated solely by rotating the drill pipe 122. In another embodiment of the disclosure, a downhole motor 155 (mud motor) is disposed in the drilling assembly 190 to rotate the drill bit 150 and the drill pipe 122. Drill pipe 122 is usually rotated to supplement the rotational power, if required, and to effect changes in the drilling direction.

In the exemplary embodiment of FIG. 1, the mud motor is shown 155 coupled to the drill bit 50 via a drive shaft (not shown) disposed in a bearing assembly 157. The mud motor rotates the drill bit 150 when the drilling fluid 131 passes through the mud motor 155 under pressure. The bearing assembly 157 supports the radial and axial forces of the drill bit. A stabilizer 158 coupled to the bearing assembly 157 acts as a centralizer for the lowermost portion of the mud motor assembly.

In one embodiment of the disclosure, a drilling sensor module 159 is placed near the drill bit 150. The drilling sensor module contains sensors, circuitry and programs and algorithms relating to the dynamic drilling parameters. Such parameters typically include bit bounce, stick-slip of the drilling assembly, backward rotation, torque, shocks, borehole and annulus pressure, acceleration measurements and other measurements of the drill bit condition. A suitable telemetry or communication sub 172 using, for example, two-way telemetry, is also provided as illustrated in the drilling assembly 190. The drilling sensor module processes the sensor information and transmits it to the surface control unit 140 via the communication sub 172.

The communication sub 172, a power unit 178 and an MWD tool 179 are all connected in tandem with the drill string 120. Flex subs, for example, are used in connecting the MWD tool 179 in the drilling assembly 190. Such subs and tools form the bottom hole drilling assembly 190 between the drill string 120 and the drill bit 150. Sensors in the drilling assembly provide various measurements related to the formation parameters. Such sensors may include, for example, a multiple propagation resistivity (MPR) tool 162 and an azimuthal propagation resistivity (APR) tool 163 for providing resistivity measurements of the formation. The communication sub 172 obtains the signals and measurements and transfers the signals, using two-way telemetry, for example, to be processed on the surface. Alternatively, the signals can be processed using a downhole processor 170 in the drilling assembly 190, the processor being configured to execute instructions that perform the methods of the present disclosure.

The surface control unit 140 receives signals from other downhole sensors and devices as well as signals from sensors $S_1$-$S_3$ and other sensors used in the system 110. The system 110 processes such signals according to programmed instructions provided to the surface control unit 140. The surface control unit 140 displays desired drilling parameters and other information on a display/monitor 161 utilized by an operator to control the drilling operations. The surface control unit 140 (also referred herein as the surface controller or the controller) may be a computer-based unit and may include a processor 142, a suitable data storage device 144, including, but not limited to, a solid state memory, hard disk, and magnetic tape, storing data and computer programs 146 for use by the processor 142. Any suitable display device 148, such as a monitor, may be provided to display images and other data during logging of the borehole 126. During operations, the controller 140 transmits operating instructions or commands to the logging tool 110, receives data from the logging tool, and processes the data in accordance with the instruction in the program 146. The controller 140 may store the processed data, display the results, including images of the borehole and/or send such information to a remote unit 160 for further processing. The controller 140 is typically adapted to activate alarms 147 when certain unsafe or undesirable operating conditions occur.

Figure 2:
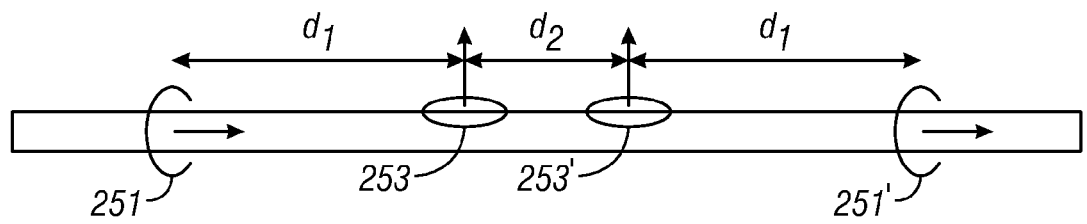
FIG. 2 shows an exemplary azimuthal propagation resistivity (APR) tool suitable for use with methods of the present disclosure.

FIG. 2 shows an azimuthal resistivity tool (referred to hereinafter as AZMRES) suitable for use with methods of the present disclosure. The AZMRES tool includes two transmitters 251, 251' whose dipole moments are aligned parallel to the tool axis direction and two receivers 253, 253' whose dipole moments are aligned perpendicular to the transmitter direction. In one embodiment of the disclosure, the tool operates at a frequency of 400 kHz. Current is induced in the formation when one of the transmitters (251, 251') is activated. The AZMRES uses cross component measurements, referred to as principal cross-components, that are obtained using the pair of transmitters disposed on either side of the two receivers. In one aspect, the first transmitter 251 is activated, and the two receivers 253 and 253' measure the magnetic field produced by the current induced in the formation. The second transmitter 251' may also be activated, with the two receivers 253 and 253' measuring the resulting magnetic fields. The signals are combined as shown in Eq. (1):

$$H_{T1} = H_2 - (d_1/(d_1+d_2))^3 \cdot H_1$$

$$H_{T2} = H_1 - (d_1/(d_1+d_2))^3 \cdot H_2 \quad (1)$$

Here, $H_1$ and $H_2$ are the measurements obtained from the first and second receivers, respectively, and the distances $d_1$ and $d_2$ are as indicated in FIG. 2. The AZMRES tool rotates with the BHA and, in an exemplary mode of operation, makes measurements at sixteen angular orientations 22.5° apart. The measurement point is defined as the point that bisects the distance between two specified receivers. In a uniform, isotropic formation, no signal is detected at either of the two receivers. It is noted that the method of the present disclosure may be used with various combinations of measurements by rotating a coordinate system of the measurements as long as the measurements (i) correspond to signals generated from opposite sides of a receiver and (ii) can be rotated to a coordinate system having principal cross-components.

Figure 3:
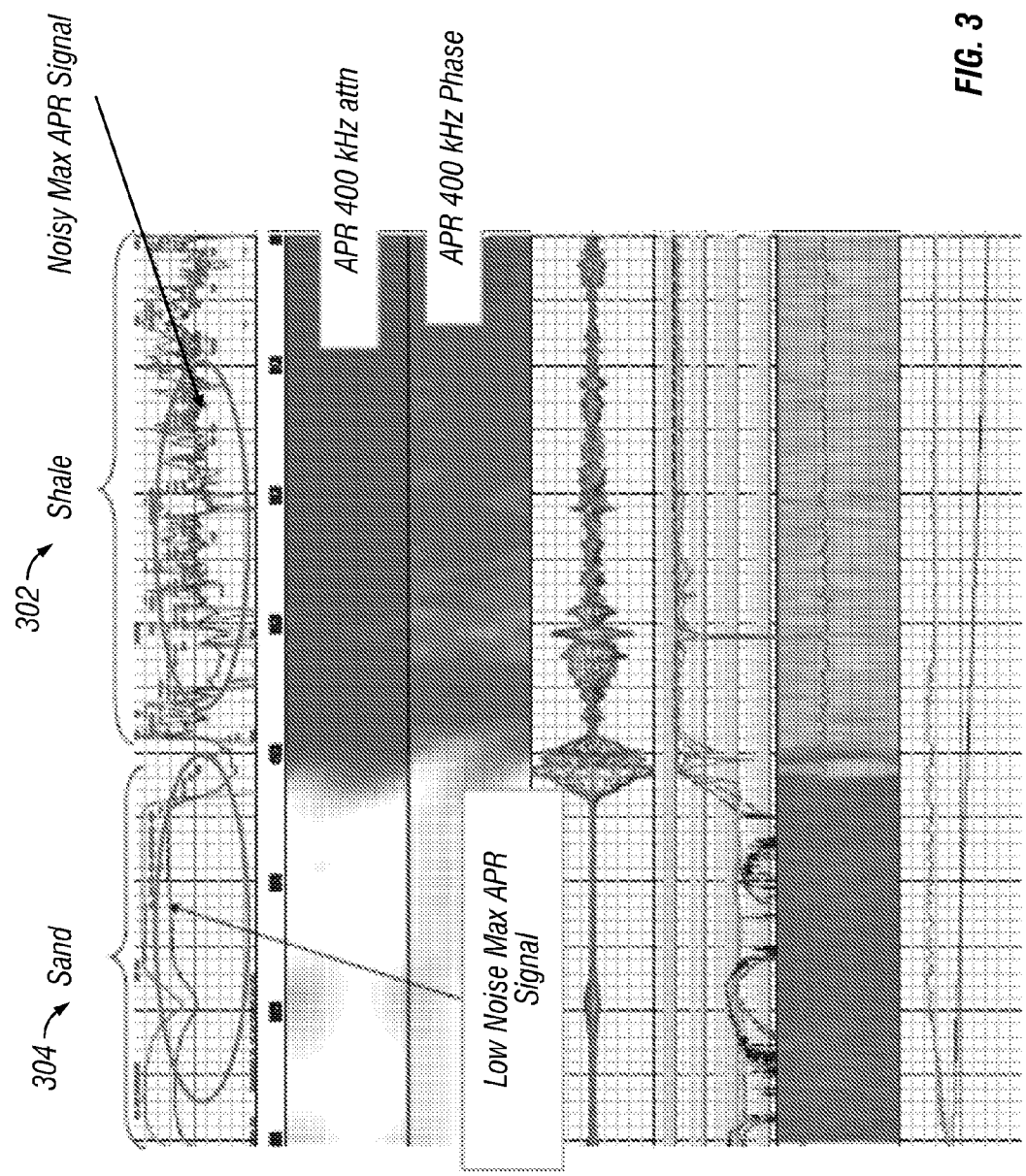
FIG. 3 shows logs obtained from an exemplary APR tool within a borehole traversing both a shale formation and a sand formation.

FIG. 3 shows exemplary APR logs obtained from a logging tool within a borehole traversing both a shale formation 302 and a sand formation 304. The logging tool is eccentered within the borehole by the same amount in both formation regions. The borehole is filled with a mud which has a resistivity that is around 100 Ω-m. The characteristic of the APR log responses differ between the shale formation log 302 and the sand formation log 304. The shale formation log 302 generally contains a high level of noise. In contrast, sand bed log 304 contains a lower level of noise than the shale formation log. The APR logs 302 and 304 illustrate typical differences between APR logs obtained in conductive and resistive formations.

Figure 4:
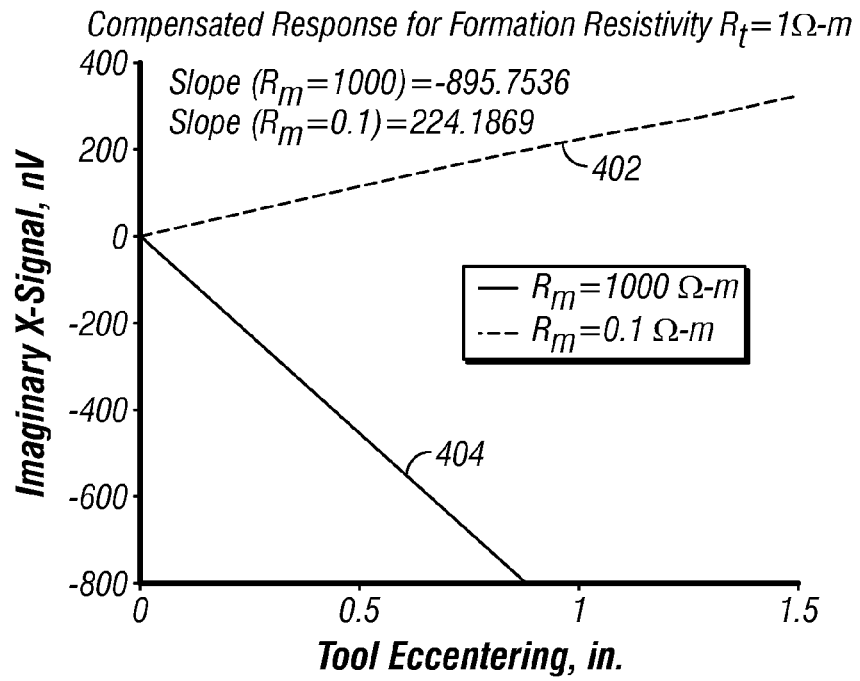
FIG. 4 illustrates the effect of tool eccentricity on responses obtained at an exemplary APR tool.
Figure 5:
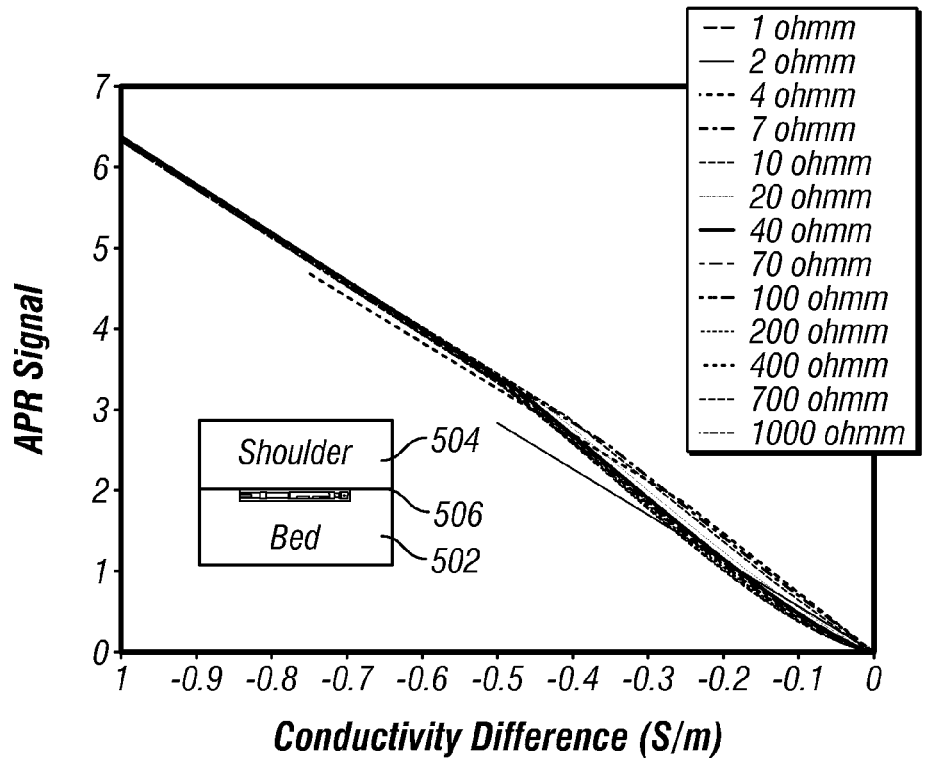
FIG. 5 shows APR tool responses obtained at a formation interface.

FIG. 4 illustrates the effect of tool eccentricity on responses obtained at an APR tool. FIG. 4 displays responses obtained using a model of an APR logging tool in a borehole penetrating a conductive formation and which is eccentered within the borehole by different amounts. The model includes a formation having resistivity $R_t$=1 Ω-m and a borehole mud resistivity of $R_m$ within the formation. Two cases of borehole mud resistivities $R_m$ are shown. Curve 402 shows the effects of borehole eccentricity on a response in a borehole with conductive mud in which $R_m$=0.1 Ω-m. Curve 404 shows the effects of borehole eccentricity on a response in a borehole with conductive mud in which $R_m$=1000 Ω-m. Tool eccentering is plotted along the horizontal axis, and the quadrature component of the response received at an X-receiver is plotted along the vertical axis. Within the range shown, the APR tool responses are linear functions of tool eccentricity. In general, the resistive borehole response (404) exhibits a stronger correlation to eccentricity than the conductive borehole (402) does. This correlation is consistent with APR responses that occur when a borehole crosses an interface, as shown in FIG. 5. It is noted that the exemplary interface may be an interface in an earth formation that has different fluids on either side of the interface. Also, the exemplary interface may be an interface between two different geologic or stratigraphic intervals.

FIG. 5 shows APR tool responses obtained at an interface. Two conductive layers, i.e., the formation (bed) 502 and shoulder 504, are separated by planar interface 506. The difference ($S_b - S_s$) of bed conductivity $S_b$ and shoulder conductivity $S_s$ is plotted along the horizontal axis and APR tool responses are plotted along the vertical axis. For several fixed values of the formation conductivity $S_b$, the APR tool responses are obtained at various values of the shoulder conductivity $S_s$ and hence at various differences in the conductivity values, $S_b - S_s$. The APR tool responses are approximately linear functions of the difference $S_b - S_s$. A larger difference in conductivity across an interface produces a stronger APR tool response than does a small difference in conductivity. This result may also be applied to the interface between borehole and formation. For a formation having $R_t$=1 Ω-m, a conductive mud ($R_m$=0.1 Ω-m) has a smaller conductivity difference with the formation that a resistive mud ($R_m$=0.1 Ω-m) does.

Figure 6:
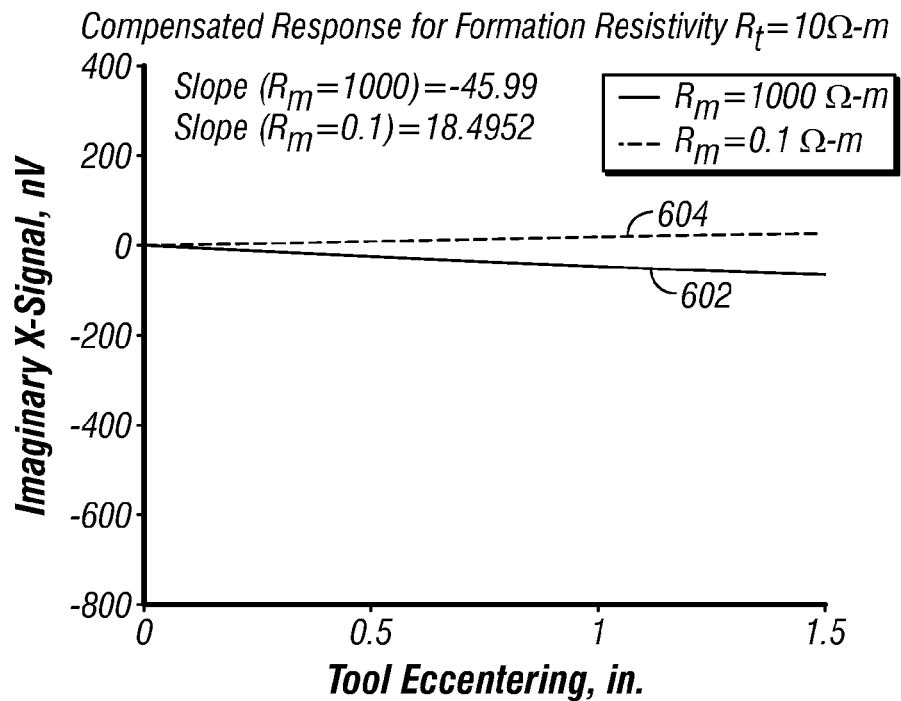
FIGS. 6 and 7 illustrate the effect of tool eccentricity on an APR tool response for formations having resistivities of 10 $\Omega$-m and 100 $\Omega$-m, respectively.
Figure 7:
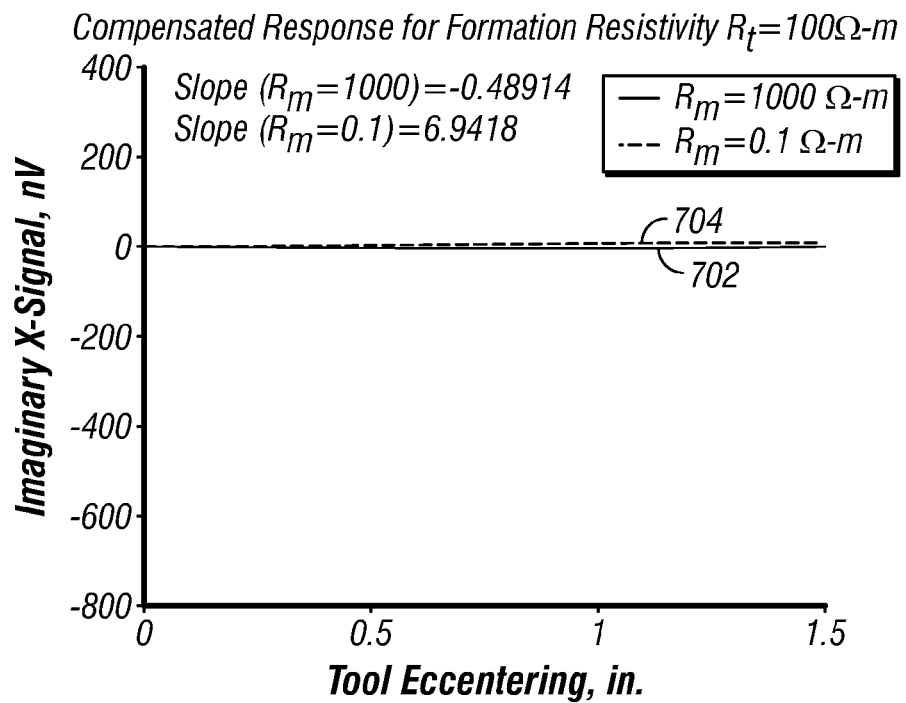

FIGS. 6 and 7 are similar to FIG. 4 and illustrate the effect of tool eccentricity on the APR tool response for formations having resistivities of 10 Ω-m and 100 Ω-m, respectively. FIG. 6 shows the effect of eccentricity on the APR tool response in a formation having resistivity $R_t$=10 Ω-m. Tool eccentricity is shown along the horizontal axis and the tool response is shown along the vertical axis. Two cases of borehole mud resistivities $R_m$ are considered: an $R_m$=1000 Ω-m (602) and an $R_m$=0.1 Ω-m (604). As compared to FIG. 4, the APR responses are less affected by tool eccentricity. FIG. 7 shows the effect of eccentricity on the APR tool response in a formation having resistivity $R_t$=100 Ω-m. Tool eccentricity is shown along the horizontal axis and the tool response is shown along the vertical axis. Two cases of borehole mud resistivities $R_m$ are considered: an $R_m$=1000 Ω-m (702) and an $R_m$=0.1 Ω-m (704). Tool eccentricity has almost no effect on the APR tool response in both conductive and resistive borehole muds.

In one aspect of the present disclosure, APR tool responses are estimated using a model of a logging tool located between two half-space formations having a common interface. The response of a tool eccentered in a borehole inside a homogeneous formation (far from an interface) and the response of the same tool at a given distance from the interface may be superimposed to compute a total APR response. The logging tool is positioned in a horizontal borehole and at a fixed distance from the center of borehole. The borehole and the eccentered tool within it are then positioned at different locations away from the interface and tool responses are computed at each location.

Figure 8:
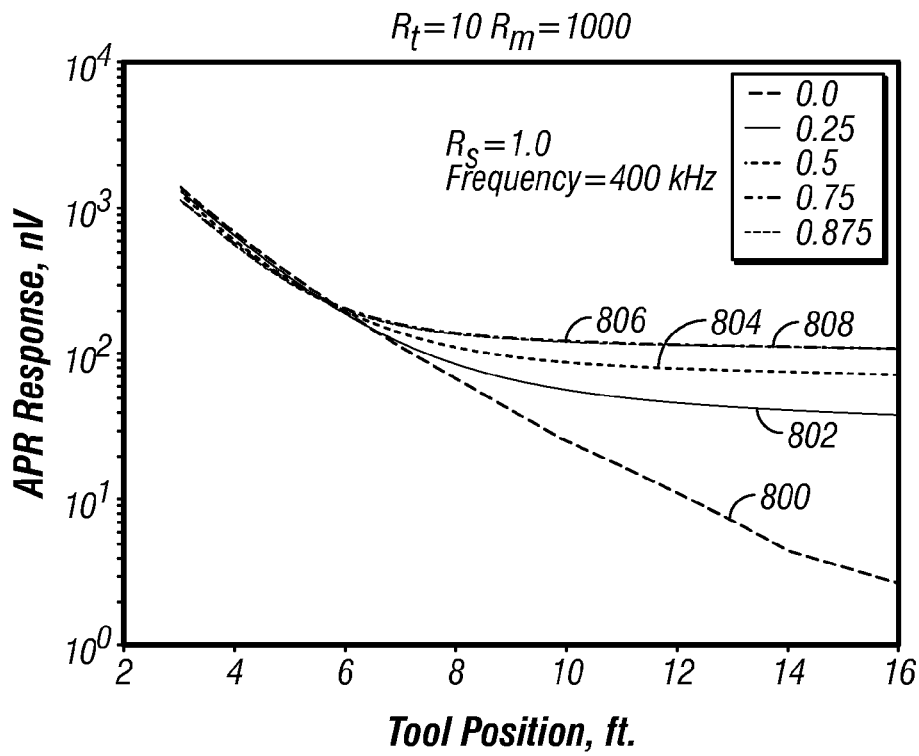
FIG. 8 shows responses obtained from a model of an APR tool disposed in a borehole at different true vertical distances (TVDs) from a formation interface.

FIG. 8 shows responses obtained from a model of an APR tool disposed in a borehole located at different locations or true vertical distances (TVDs) from a formation interface. The distance of the tool from the interface is plotted along the horizontal axis. APR tool response is plotted along the vertical axis. The resistivity of the lower formation 502 is 10 Ω-m, the resistivity of the shoulder formation 504 is 1.0 Ω-m, and the mud resistivity is 1000 Ω-m. The frequency of tool operation is 400 kHz. Curves 800, 802, 804, 806, and 808 represent modeled APR tool responses obtained at different tool positions when the tool is eccentered by 0, 0.25, 0.5, 0.75, and 0.875 inches, respectively. Curve 800 represents a response curve from an APR tool with no eccentricity. Since there is no eccentricity, curve 800 is totally responsive to the formation parameters.

Figure 9:
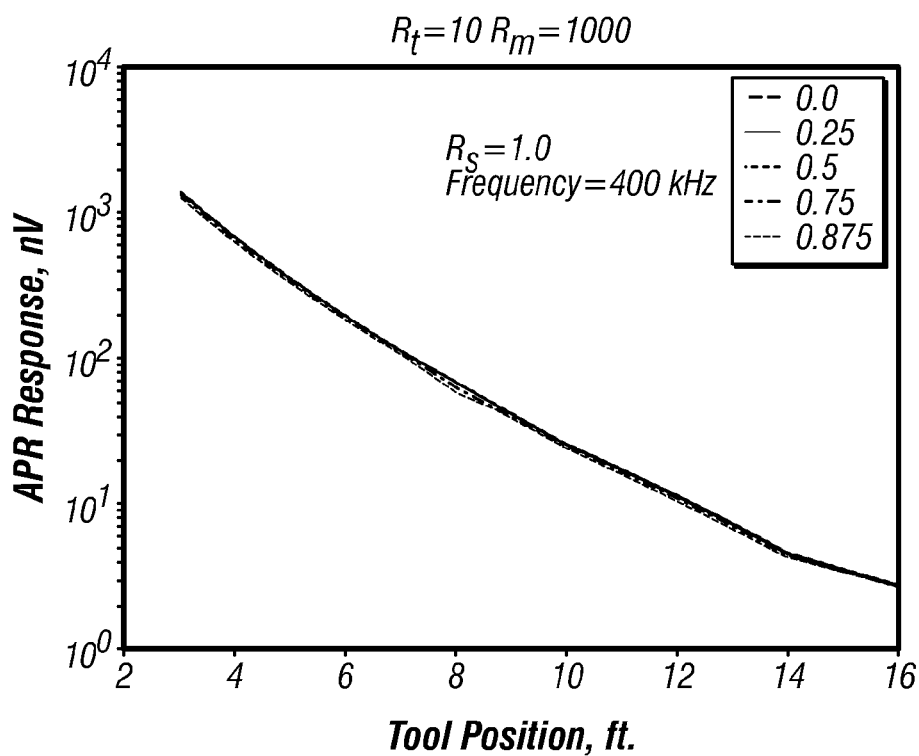
FIG. 9 shows the APR responses from FIG. 8 upon being adjusted using a response obtained when the borehole and the tool are at a location far from the formation interface.

FIG. 9 shows APR tool responses from FIG. 8 adjusted for a corresponding response obtained when the borehole and the APR tool are located in the lower formation (502, FIG. 5) far enough from the interface to be negligibly affected by the interface. These responses represent eccentricity effects. The APR tool responses are computed for a homogeneous formation of resistivity equal to that of the lower formation 502. These computed responses are then subtracted from the curves in FIG. 8. The resulting response curves of FIG. 9 from the eccentered tool virtually overlay the centered response curve (800 of FIG. 8). Therefore, the total APR response $H_{total}$ is a combination of the response of the APR tool located at a distance $d_b$ from the formation interface and the response of the tool eccentered within in a borehole inside a homogeneous medium, such as the lower formation. This is described in Eq. (2):

$$H_{Total} \approx H_0(R_t, R_s, d_b) + E(R_t, R_m, h) \quad (2)$$

The first term on the right-hand side of Eq. (2) is the response of the APR tool and depends on the resistivity of the formation with tool (bed resistivity, $R_t$), the shoulder resistivity $R_s$ and the distance from the tool to the interface between the two formations $d_b$. The second term on the right-hand side of Eq. (2) is an eccentricity response and is a function of the borehole resistivity $R_m$, the formation resistivity $R_t$ and the tool eccentricity h. The eccentricity response may be further expressed as a product of a response that is a function of shoulder and formation resistivities and tool eccentricity h, as shown in Eq. (3):

$$E(R_t, R_m, h) = S(R_t, R_m) \cdot h \quad (3)$$

Using Eq. (3), slopes of eccentricity responses may be precomputed for various combinations of borehole resistivities and formation resistivities and subsequently be stored on a suitable medium.

Figure 10:
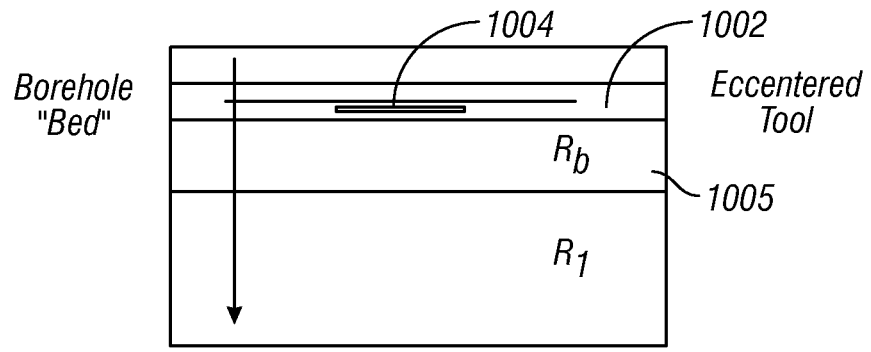
FIG. 10 shows a model of an earth formation in an alternate aspect of the present disclosure in which the borehole is replaced by a formation of the same thickness.

FIG. 10 shows a model similar to the model of FIG. 5 in which the borehole is replaced by a formation 1002 of the same thickness as the borehole. The model of FIG. 10 uses a 1-D layered modeling program to estimate APR tool responses. Tool 1004 is offset from the center of the formation 1002 by a fixed value of 0.5 inches. The combined tool and formation 1002 are moved downward from a location above the formation interface 1005 to a location below the interface, and responses are computed at each location. The formation interface 1005 is the reference point in the resulting logs.

Figure 11:
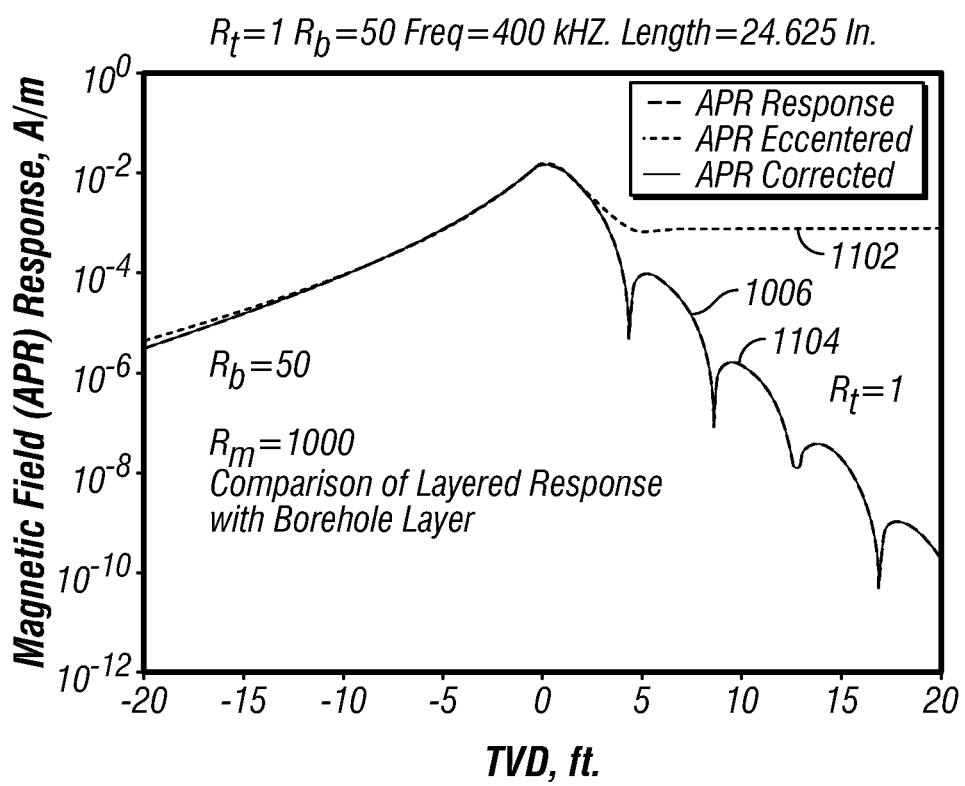
FIG. 11 shows modeled APR tool responses obtained using the model of FIG. 10.

FIG. 11 shows APR tool responses computed using the model of FIG. 10. Curve 1102 represents the APR tool response obtained at several TVD for a tool eccentered 0.5 inches from the center of the formation 1002. Curve 1104 is the APR tool response obtained using a tool centered in the borehole formation 1002. Curve 1106 is obtained by subtracting the eccentered tool response 1102 of the APR tool from the corresponding homogeneous formation with the response from the borehole formation 1002. The responses in the interval from 0 feet to 3 feet are dominated by the boundary effects. However, beyond a depth of three feet, the eccentricity response dominates. Curves 1104 and 1106 virtually overlay each other, thereby confirming that the APR total response is a combination of the response of the APR tool to the formation interface and the eccentered response obtained in a formation layer representing the borehole located far from and unaffected by the interface.

Parameters of interest of the formation, such as a resistivity of a remote formation, a distance to a formation interface and a dip and azimuth orientation of a formation interface may be obtained from a combination of MPR and APR tool responses using measurements from coaxial coils (also known as ZZ) and XZ cross-component measurements. In one exemplary aspect, MPR and APR tool responses may be obtained at two frequencies, with two transmitter spacings on either side of the receivers, using two kinds of measurements (ZZ and XZ) and by obtaining real and imaginary parts of the response. The number of variables in this exemplary aspect has 32 possible measurement combinations, which can make modeling of the tool responses complex. Eccentricity and invasion effects also add complexity to the model.

In principle, a fully 3D modeling code can perform an inversion on tool responses to obtain the parameters. However, this is generally impractical because (1) the complexity of the inversion is computationally prohibitive and (2) there are often too few measurements available to perform an inversion that returns all of the parameters. This is especially true in real-time situations.

Several inversion processes, including correction inversion, dual-frequency inversion and joint inversion may be used to adjust tool responses for the effect of tool eccentricity. In correction inversion, first measurements are corrected for the effect of tool eccentricity and then the corrected measurements are inverted to obtain formation parameters. Correction inversion may be performed after directly measuring values such as mud resistivity, formation resistivity, eccentricity and direction of eccentricity. In one aspect, formation resistivity may be estimated using 2 MHz short MPR tool measurements. The eccentricity h may be determined from caliper measurements and the direction of eccentricity may be determined using a high-resolution caliper measurement such as used in ultrasonic imaging methods. An inversion is then performed to remove the contribution of eccentricity from the total response. The result of the inversion may be used to compute the distance to the interface and other parameters.

In a dual-frequency inversion, measurements are obtained at different frequencies to reduce eccentricity effects. The APR response has a strong linear dependence on frequency. Eccentricity effects may be reduced by measuring responses $H_1$ and $H_2$ at two different frequencies $f_1$ and $f_2$ and using Eq. (3):

$$H = H_1 - \frac{f_1}{f_2} H_2. \quad (4)$$

An inversion is performed on the obtained measurements.

In a joint-inversion approach, all parameters, including non-formation parameters such as eccentricity are estimated using a nonlinear inversion method. Referring to the exemplary aspect above having 32 combinations of parameters, the borehole diameter and the borehole resistivity are generally known. Thus, four parameters remain to be estimated: the resistivities of the two half-space formations, the distance of the tool to the interface, and the eccentricity of the tool in the borehole. These may be estimated using a formation model with two half-spaces separated by a single interface. Various methods may be adopted to determine the unknown parameters, such as a Levenberg-Marquardt method with constraints. Alternatively, it is possible to reduce the dimensionality of the problem by solving for the unknown parameters separately and iterating the method. In particular, the eccentricity effect response may be obtained separately from the response due to the remaining parameters (i.e., formation resistivity $R_t$, shoulder formation resistivity $R_b$ and distance to the interface $Z_d$).

FIGS. 12-17 show results of an inversion performed on data generated from an exemplary formation model such as a layered modeling program of FIG. 10. The parameters of the model are as follows: $R_b$=50 Ω-m and $R_t$=1 Ω-m. Since the eccentricity response may be obtained by superposition, the total response is computed using two separate 1-D forward models. The formation boundary response may be computed using the layered program. The response due to eccentricity may be pre-computed, and a slope of the eccentricity responses for a large number of cases of borehole and formation resistivities may be stored in a table or in a database in a suitable storage medium. The total response may then be computed from the formation boundary response and the eccentricity response.

Figure 12:
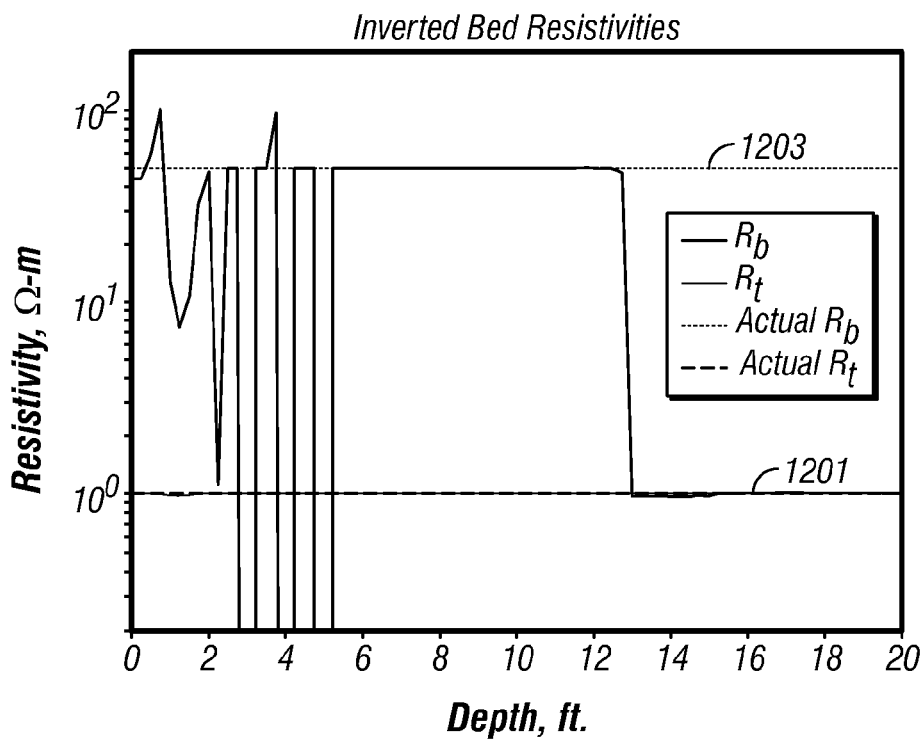
FIGS. 12-17 show results calculated using an inversion procedure on data from an exemplary formation model.
Figure 13:
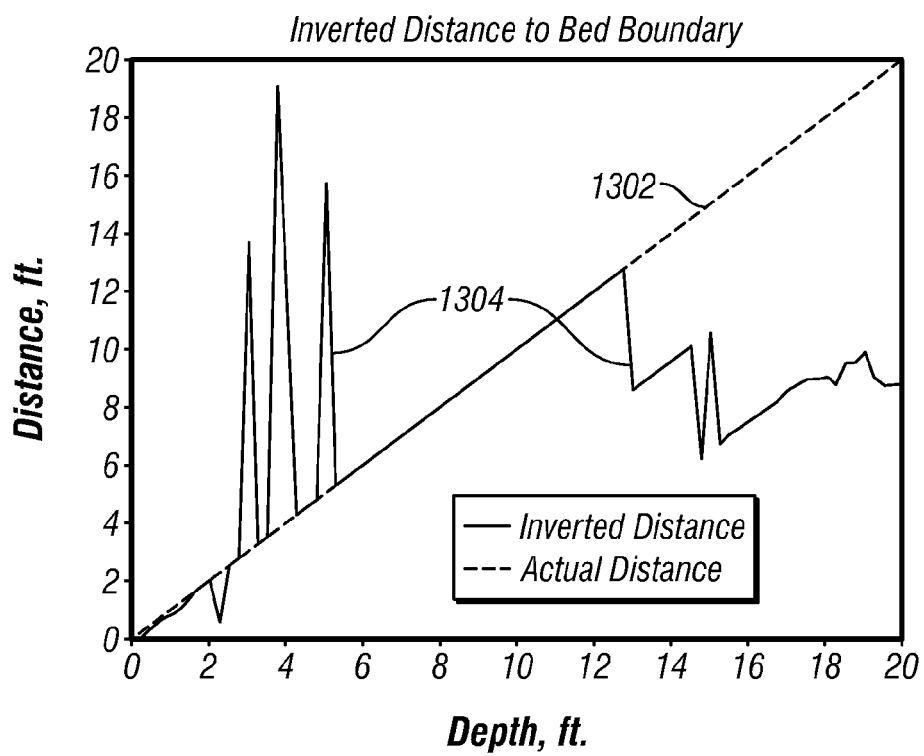
Figure 14:
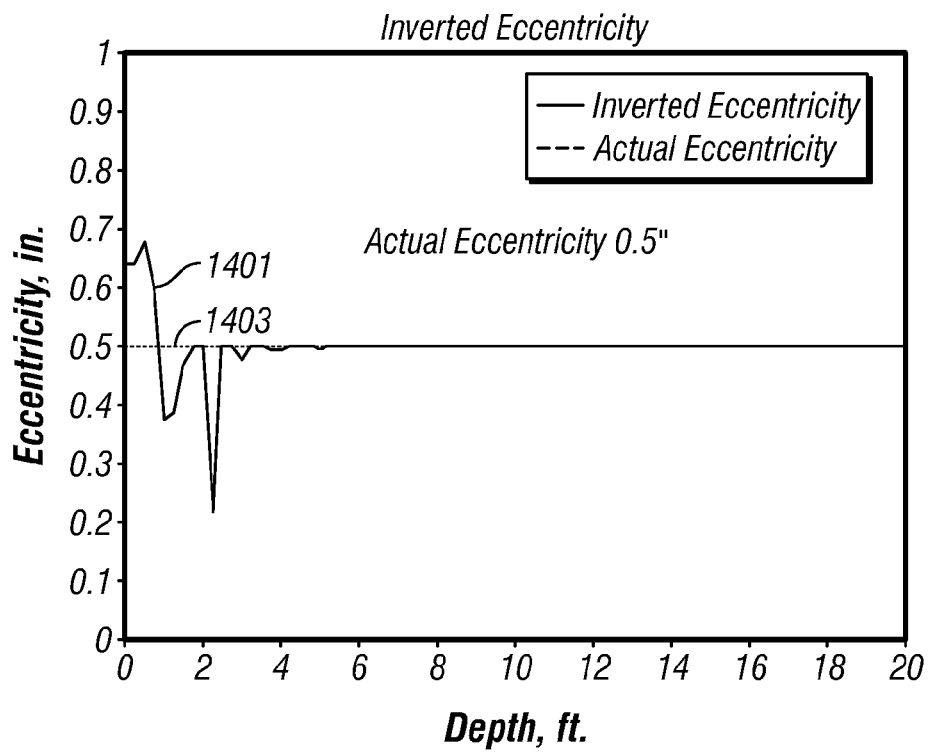

FIGS. 12, 13 and 14 show the results of an inversion method of the present disclosure as applied to the exemplary data of FIG. 11. Results may be refined using an iteration loop. The inversion may be performed for responses at a particular location of the APR tool below the interface before moving to a next depth.

FIG. 12 shows a graph of resistivities of the two half-spaces as calculated using the inversion method of the present disclosure on the model data. Depth is shown over an interval from 0 feet to 20 feet along the horizontal axis, and calculated resistivity is shown along the vertical axis. The formation resistivity $R_t$ (1.0 Ω-m) 1201 is recovered for virtually the entire interval of 20 feet. The shoulder formation resistivity $R_b$ (50.0 Ω-m) 1103 is recovered near the interface (approximately 0 feet) and in the interval from 5 feet to 13 feet. Inversion is performed only on responses obtained at locations below the interface (at a depth greater than 0 feet).

FIG. 13 shows a graph of distance to the interface calculated using the inversion method of the present disclosure. Actual depth is shown along the horizontal axis, while the calculated distance is shown along the vertical axis. The actual depth is recovered over the interval from 0 feet to 2 feet and also over the interval from 5 feet to 13 feet. In the interval from 2 feet to 5 feet, the calculated distance 1304 displays substantial deviations from the actual depth 1302 at various points. In the interval from 13 feet to 20 feet, the calculated distance is erratic and displays an average of approximately 8 feet.

FIG. 14 shows eccentricity values calculated using the inversion method of the present disclosure. Depth is shown along the horizontal axis, and calculated eccentricity is shown along the vertical axis. The computed value of eccentricity (1401) agrees with the actual eccentricity (1403) at a depth greater than 3 feet due to the general dominance of the eccentricity response for APR tool responses in this interval. In the interval from 0 feet to 3 feet, the magnitude of the eccentricity effect is very small in comparison to the boundary response.

Figure 15:
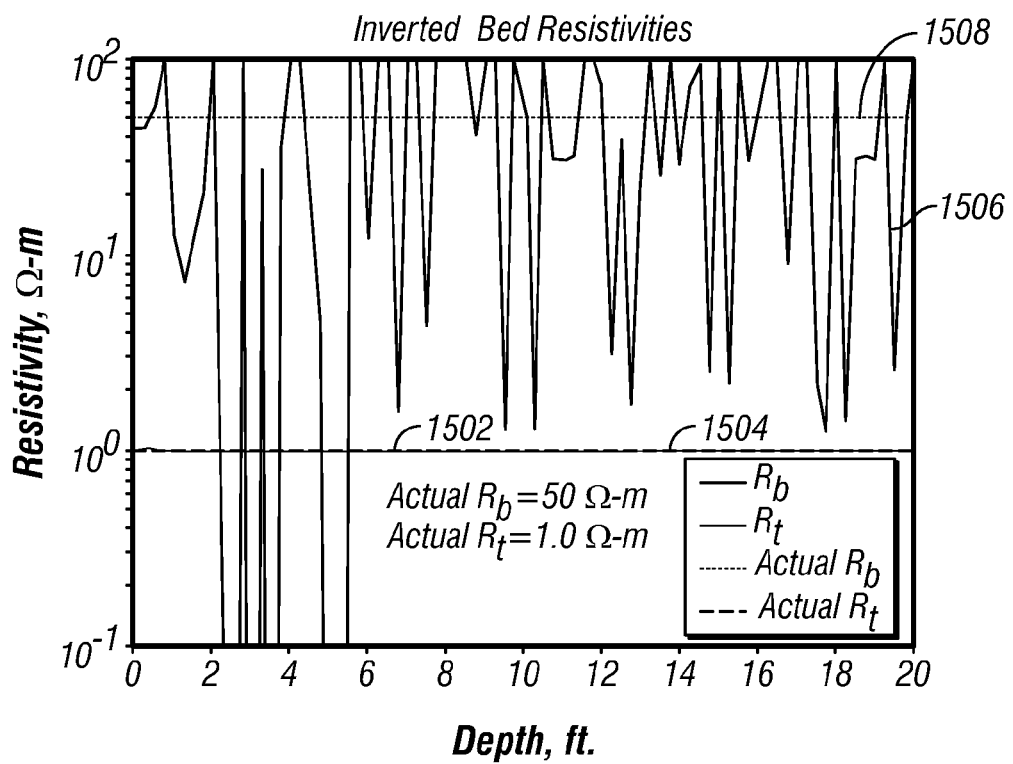
Figure 16:
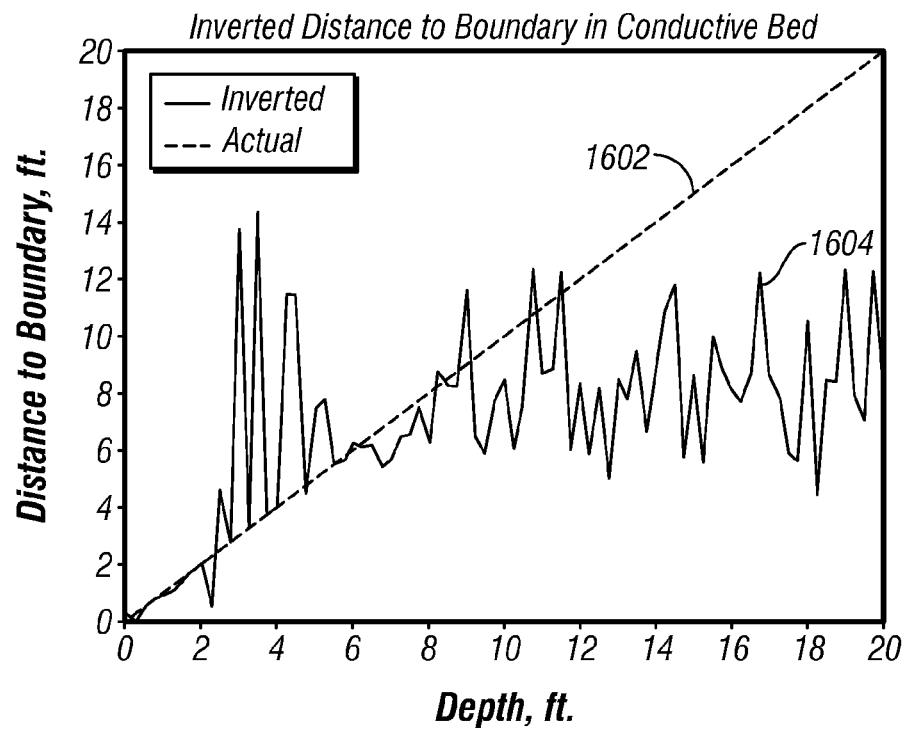
Figure 17:
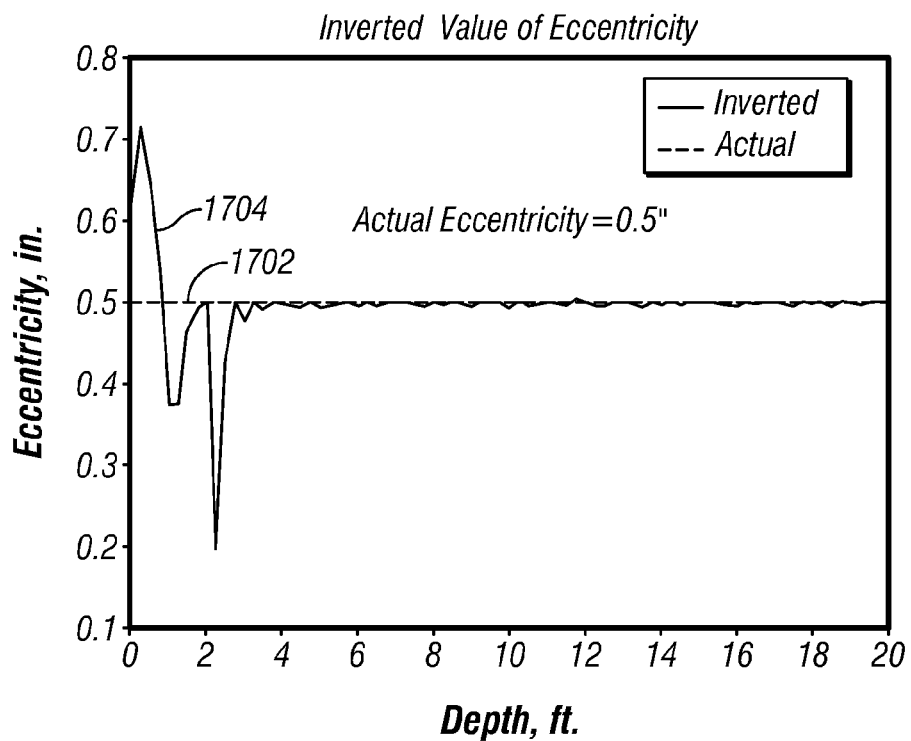

FIGS. 15, 16 and 17 show results of the inversion method of the present disclosure as applied to a formation model including measurement inaccuracies are present. To simulate measurement inaccuracies, one percent uniformly distributed noise is added to the responses before inversion. The inversion is performed at tool locations below the interface and in a formation with $R_t$=1 Ω-m.

FIG. 15 shows formation and shoulder resistivities calculated using the inversion method of the present disclosure with measurement inaccuracies. Depth is shown from 0-20 feet along the horizontal axis, and calculated resistivity is shown along the vertical axis. The calculated values of formation resistivity 1502 agree with the actual value 1504 of formation resistivity ($R_t$=1.0 Ω-m) for nearly the entire interval from 0 feet to 20 feet. However, the calculated value of the side formation resistivity ($R_t$=50 Ω-m) 1506 does not substantially agree with the actual value 1508 except near the interface (approximately 0 feet).

FIG. 16 shows distance to a formation interface calculated using the inversion method of the present disclosure with measurement inaccuracies. Actual depth is shown along the horizontal axis, and the computed distance is shown along the vertical axis. Actual depth 1602 and the calculated distance 1604 agree over the interval from 0 feet to about 2 feet from the interface. In the interval from 2 feet to 9 feet, the calculated distance is affected by the measurement inaccuracies. At a depth greater than 9 feet, the calculated distance becomes erratic and has an average value of approximately 8 feet.

FIG. 17 shows eccentricity calculated using the inversion method of the present disclosure with measurement inaccuracies. Depth is shown along the horizontal axis and eccentricity is shown along the vertical axis. Calculated eccentricity is compared with the actual eccentricity. The computed value of eccentricity 1704 is substantially different from the actual value 1702 over the interval from 0 feet to about 3 feet from the interface. Beyond 3 feet, the computed value agrees with the actual eccentricity value in spite of the measurement inaccuracies. Over the interval from 0 feet to 3 feet, the magnitude of the eccentricity component is relatively small in comparison to the boundary response. Thus, there is agreement between curves 1702 and 1704 at those depths.

Figure 18:
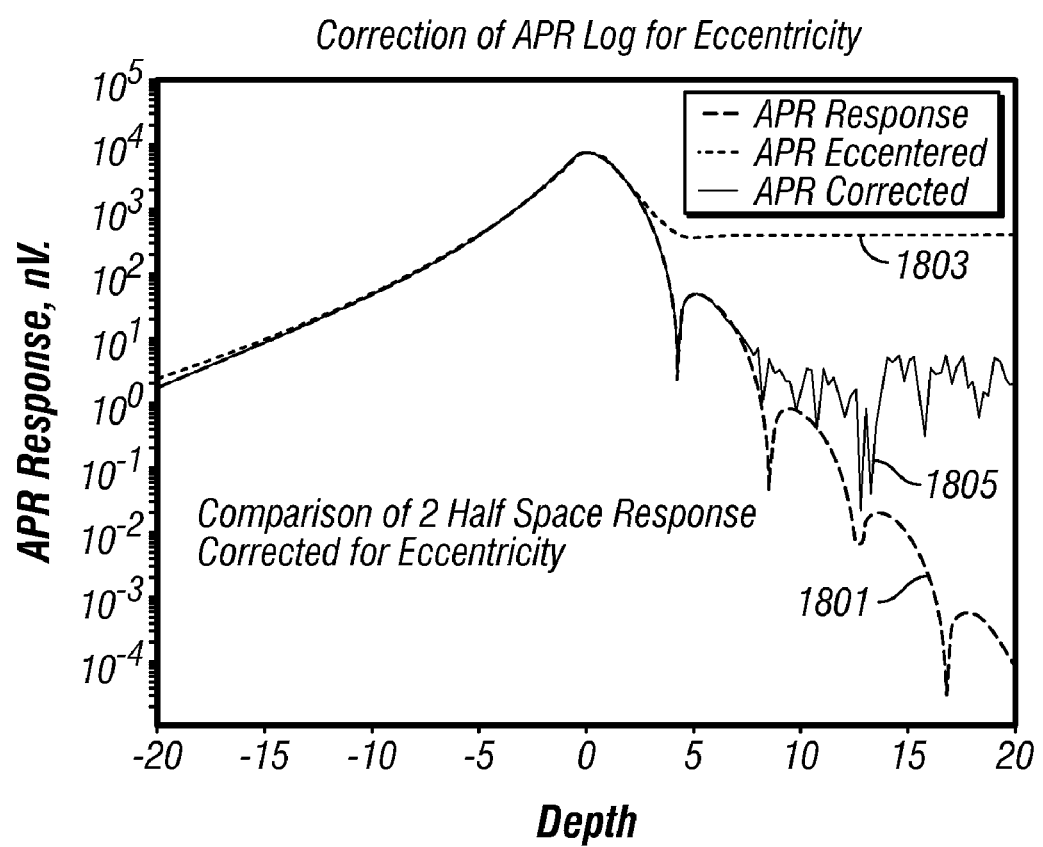
FIG. 18 shows modeled responses corrected using calculated eccentricity values.

FIG. 18 shows modeled responses corrected using calculated eccentricity values. The plot shows centered 1801, eccentered 1803 and corrected 1805 logs obtained from a conductive formation (1 Ω-m) obtained using the values computed in FIGS. 15, 16 and 17. The corrected log (1805) agrees with the centered log (1801) over the interval from 0 feet to about 7 feet. Over the interval from 7 feet to 20 feet, the measurement inaccuracies affect the log. However, the noise due to measurement inaccuracies is small enough (typically less than 10 nV) to generally lie below a noise threshold.

Figure 19:
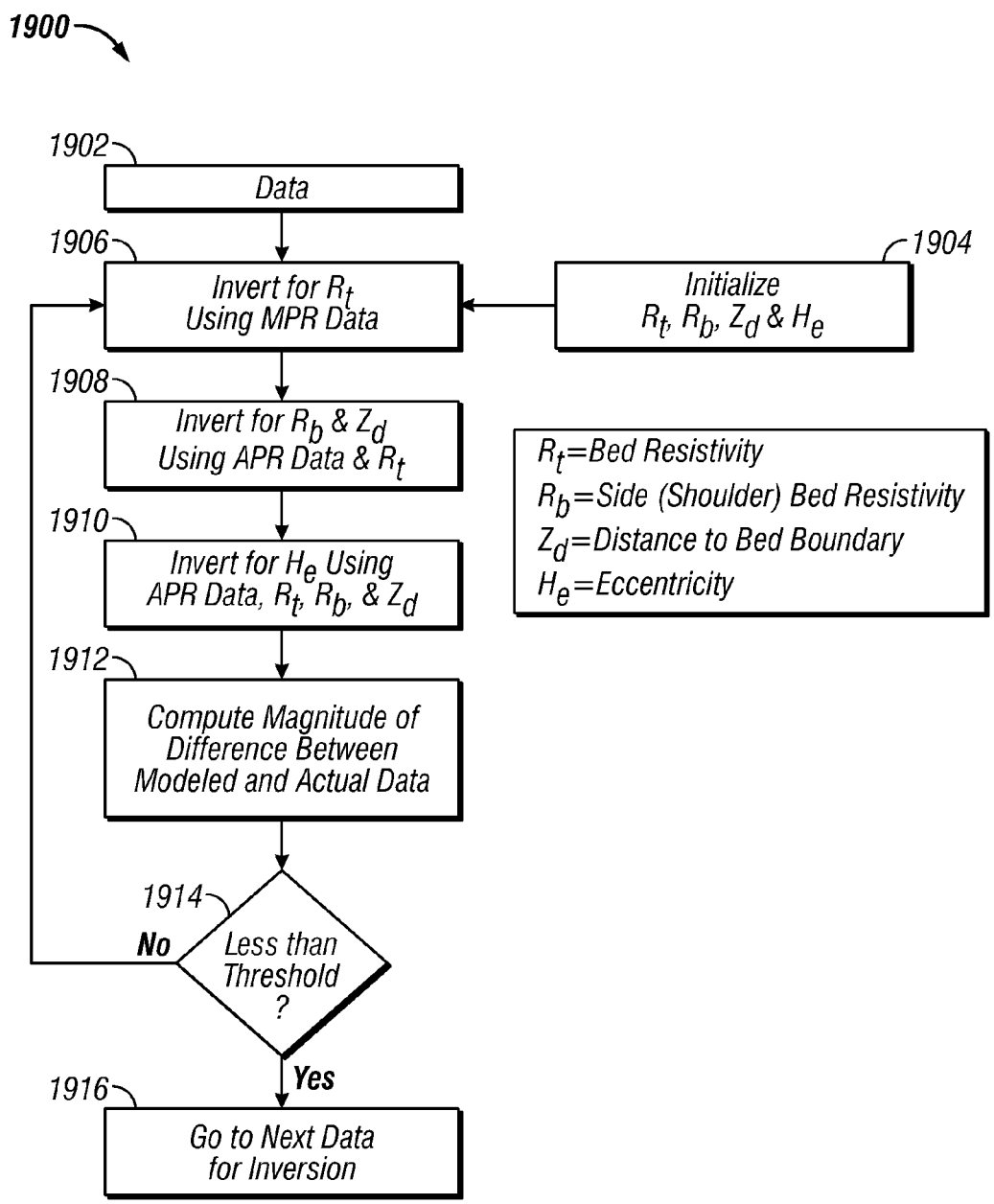
FIG. 19 shows a flowchart detailing an exemplary inversion method of the present disclosure for obtaining a property of the earth formation.

FIG. 19 shows a flow chart 1900 detailing an exemplary inversion method of the present disclosure for obtaining parameters of interest. A formation model is initialized and MPR and APR tool response are calculated in Box 1902. Initialized parameters $R_t$, $R_b$, $Z_d$ and $H_e$ (Box 1904) are provided. The inversion method is split into parts, each part addressing the parameter(s) of interest that are most sensitive to the relevant tool response. MPR tool measurements, for example, are strongly influenced by the formation resistivity $R_t$ surrounding the borehole. APR measurements are generally influenced by the eccentricity $H_e$ of the tool, the location of the interface $Z_d$ and, to a lesser extent, the resistivity of the shoulder $R_b$. Thus, an inversion is first performed using the calculated MPR responses (Box 1906) to obtain an estimate of $R_t$. The estimated value of $R_t$ and the APR tool data are then inverted to obtain values of $R_b$ and $Z_d$ (Box 1908). $R_b$, $R_t$ and $Z_d$ are then used to calculate or update a value of the eccentricity $H_e$ (Box 1910). Then in Box 1912, a difference is determined between modeled data and actual data. If the magnitude of the difference is within a selected threshold (Box 1914), the inversion method either stops or continues to the next set of data (Box 1916), typically data obtained at a next depth. Otherwise, the procedure returns to Box 1906 and uses the newly-computed values in the next round of calculations.

It will be appreciated by those skilled in the art that resistivity is the inverse of conductivity. Accordingly, any reference in this disclosure to resistivity is considered to include disclosure as to conductivity inverted. Similarly, any reference in this disclosure to conductivity is considered to include disclosure as to the resistivity inverted.

Data processing may be accomplished with the use of a computer program implemented on a suitable computer-readable medium that enables a circuitry, such as a processor, to perform and control the processing. The term 'processor' as employed in this application is used in its traditionally broad sense and is intended to include such devices as single-core computers, multiple-core computers, distributed computing systems, field programmable gate arrays (FPGAs) and the like. The computer-readable medium referenced in this disclosure is any medium that may be read by a machine and may include magnetic media, RAM, ROM, EPROM, EAROM, flash memory and optical disks. In addition, results of the processing may be stored on a suitable medium. The processing may occur downhole or at a surface location or at a remote location. The processing may be done substantially in real time or at a time subsequent to acquisition of the data. In an alternative embodiment, part of the processing may be done downhole with the remainder conducted at the surface location.

While the foregoing disclosure is directed to the exemplary embodiments of the disclosure, various modifications will be apparent to those skilled in the art. It is intended that all variations within the scope and spirit of the appended claims be embraced by the foregoing disclosure.

What is claimed is:

1. A method of evaluating an earth formation, the method comprising:
    obtaining first azimuthally-independent resistivity measurements of the formation and second azimuthally-sensitive resistivity measurements of the formation using a logging tool; and
    estimating a value of a property of the earth formation using the first measurements and the second measurements, the estimation being substantially unaffected by a displacement of the logging tool from a center of the borehole.

2. The method of claim 1 wherein estimating the value of the property further comprises estimating the displacement of the logging tool from the center of the borehole and correcting the second measurements for the estimated displacement.

3. The method of claim 1 wherein estimating the value of the property of the earth formation further comprises:
    obtaining a value of a resistivity of a borehole fluid;
    estimating a value of a resistivity of the formation using the second resistivity measurements;
    using a caliper measurement to estimate the displacement of the logging tool from the center of the borehole; and
    inverting the first measurements and the second measurements using the obtained resistivity of the borehole fluid, the estimated resistivity of the formation, and the estimated displacement of the logging tool, to provide an estimate of a distance to an interface in the formation.

4. The method of claim 1 wherein the first and second measurements further comprise measurements at a first frequency and a second frequency, and wherein estimating the value of the property of the earth formation further comprises combining the first set of measurements and the second set of measurements using the first frequency and the second frequency.

5. The method of claim 4 wherein combining the first set of measurements and the second set of measurements further comprises using a relationship of the form:

$$H = H_1 - \frac{f_1}{f_2} H_2$$

wherein $H_1$ is a measurement at a first frequency $f_1$ and $H_2$ is a measurement at a second frequency $H_2$.

6. The method of claim 1 wherein estimating the value of the property of the earth formation further comprises performing an inversion of the first resistivity measurements and the second resistivity measurements to estimate:
    a value of a distance of the logging tool to an interface in the formation,
    a first resistivity of the earth formation on a first side of the interface and a second resistivity of the earth formation on a second side of the interface; and
    a value of the displacement of the logging tool from the center of the borehole.

7. The method of claim 6 further comprising estimating the value of the displacement of the logging tool from the center of the borehole in claim 5 prior to estimating the value of the distance of the logging tool to the interface in the earth formation and estimating the first resistivity and the second resistivity of the earth formation.

8. The method of claim 1 further comprising using a drilling tubular to convey the logging tool into the borehole on a bottomhole assembly.

9. An apparatus configured to evaluate an earth formation, the apparatus comprising:
    a logging tool configured to be conveyed into a borehole and obtain first azimuthally-independent resistivity measurements of the formation and second azimuthally-sensitive resistivity measurements of the formation; and
    at least one processor configured to estimate a value of a property of the earth formation using the first measurements and the second measurements, the estimate being substantially unaffected by a displacement of the logging tool from a center of the borehole.

10. The apparatus of claim 9 wherein the at least one processor is further configured to estimate the value of the property of the earth by estimating a value of the displacement of the logging tool from the center of the borehole and correcting the second measurements for the displacement.

11. The apparatus of claim 9 further comprising:
    a caliper configured to provide a measurement indicative of the displacement of the logging tool from the center of the borehole;
    and wherein the at least one processor is configured to estimate the value of the property of the earth formation by further:
        estimating the displacement of the logging tool from the center of the borehole by using the measurement from the caliper,
        estimating a value of a resistivity of the formation using the second set of resistivity measurements; and
        inverting the first measurements and the second measurements using an obtained resistivity of a borehole fluid, the estimated resistivity of the formation, and the estimated displacement of the logging tool, to provide an estimate of a distance to a bed boundary in the formation.

12. The apparatus of claim 9 wherein the logging tool is further configured to make the first and second measurements at a first frequency and a second frequency, and wherein the at least one processor is further configured to estimate the value of the property of the earth formation by combining the first measurements and the second measurements using the first frequency and the second frequency.

13. The apparatus of claim 12 wherein the at least one processor is further configured to perform the combining of the first measurements and the second measurements using a relationship of the form:

$$H = H_1 - \frac{f_1}{f_2} H_2$$

wherein $H_1$ is a measurement at a first frequency $f_1$ and $H_2$ is a measurement at a second frequency $H_2$.

14. The apparatus of claim 9 wherein the at least one processor is further configured to estimate the value of the property of the earth formation by performing an inversion of the first resistivity measurements and the second resistivity measurements to estimate:
  a value of a distance of the logging tool to an interface in the formation,
  a first resistivity of the earth formation on one side of the interface and a second resistivity of the earth formation on another side of the interface, and
  a value of the displacement of the logging tool from the center of the borehole.

15. The apparatus of claim 14 wherein the at least one processor is further configured to estimate the value of the displacement of the logging tool from the center of the borehole prior to estimating the value of the distance of the logging tool to the interface in the earth formation and estimating the first resistivity and the second resistivity of the earth formation.

16. The apparatus of claim 9 further comprising a drilling tubular configured to convey the logging tool into the borehole on a bottomhole assembly.

17. A non-transitory computer-readable medium product having instructions thereon that when read by at least one processor cause the at least one processor to execute a method, the method comprising:
  using first azimuthally-independent resistivity measurements from a logging tool conveyed in a borehole and second azimuthally-sensitive measurements made by the logging tool for estimating a value of a property of the earth formation, wherein the estimate is substantially unaffected by a displacement of the logging tool from a center of the borehole.

18. The non-transitory computer-readable medium product of claim 17 wherein the instructions further enable the at least one processor to:
  use a caliper measurement to estimate the displacement of the logging tool from the center of the borehole,
  use the estimated displacement and an obtained value of a resistivity of a borehole fluid, and
  invert the first measurements and the second measurements using the obtained resistivity of the borehole fluid, an estimated resistivity of the formation, and the estimated displacement of the logging tool, to provide an estimate of a distance to a bed boundary in the formation.

19. The non-transitory computer-readable medium product of claim 17 further comprising at least one of: (i) a RAM, (ii) a ROM, (iii) an EPROM, (iv) an EAROM, (v) flash memory, and (vi) an optical disk.

* * * * *